3,639,610
CONTROLLING NEMATODES WITH N-CAR-BAMYL-2-IMINO-1,3-OXATHIOLANES

Bernard Pflugfelder, Artix, France, assignor to Societe Nationale des Petroles d'Aquitaine, Tour Aquitaine, France
No Drawing. Application Dec. 10, 1968, Ser. No. 782,775, which is a continuation-in-part of application Ser. No. 478,763, Aug. 10, 1965. Divided and this application Nov. 26, 1969, Ser. No. 877,576
Int. Cl. A01n 9/12
U.S. Cl. 424—276
2 Claims

ABSTRACT OF THE DISCLOSURE

A method is provided for controlling nematodes with N-carbamyl-2-imino-1,3-oxathiolanes.

CROSS REFERENCE TO RELATED APPLICATION

This application is a divisional of United States application Ser. No. 782,775, filed Dec. 10, 1968, now abandoned, which was a continuation-in-part of United States application Ser. No. 478,763, filed Aug. 10, 1965, now abandoned.

BACKGROUND OF THE INVENTION

Field of the invention

The present invention relates to a new and fairly simple procedure for the preparation of N-carbamyl-2-imino-1,3-oxathiolanes by a process involving the reaction of an alpha-alkylene oxide with a aqueous solution of a thiocyanic acid salt, the reaction being conducted at a low temperature and at a moderately acid to neutral pH. This is followed by stabilization of the pH of the mixture, heating the condensation product thus formed at a higher temperature, and then separating the desired product from the reaction mixture.

The products of the present process that is, the N-carbamyl-2-imino-1,3-oxathiolanes, are useful as pesticides and more particularly, exhibit nematocidal activity. The invention further relates to a method for controlling nematodes and to nematocidal compositions containing, as the active ingredient, an N-carbamyl-2-imino-1,3-oxathiolane.

Description of the prior art

N - carbamyl - 2 - imino - 1,3 - oxathiolanes have been generally prepared, in prior art procedures, by reacting potassium cyanate in an acetic acid medium with the corresponding 2-imino - 1,3 - oxathiolane hydrochloride. The starting 1,3-oxathiolane compound is in turn prepared by reacting thiocyanic acid with an alkylene oxide in an ether solution, this reaction providing the thiocyanato hydroxyalkane which is then transformed into the 2-imino-1,3-oxathiolane hydrochloride by treatment with dry gaseous HCl; it is then necessary to separate the hydrochloride from its ethereal mother liquor in order to cause it to react with the potassium cyanate in the presence of acetic acid. This classic process is referred to in the article by Th. Wagner-Jauregg and M. Haring, which appeared in Helvetica Chimica Acta 1958, volume 41, pp. 377–385. The prior art procedure is obviously unsuitable for commercial or large scale production since it involves at least four successive steps and consequently, the yields obtained by the use of such a complicated procedure are poor.

SUMMARY OF THE INVENTION

In accordance with the process of the present invention, N-carbamyl-2-imino - 1,3 - oxathiolanes are obtained by reacting an alkylene oxide with an aqueous solution of a thiocyanic acid salt at a low temperature, that is a temperature from 0 to 30° C., while maintaining the pH of the solution at a moderately acid to neutral pH, i.e., at a pH between 5 and 7; heating the condensation product which is thus obtained at a temperature between 50° and 80° C. (preferably at a temperature between 60° and 70° C.) after stabilization of the pH and then discontinuing the heating when the expected quantity of the desired product is formed, viz, when, upon cooling to ambient temperature, i.e., between 20° and 30° C., no further precipitation of the desired product occurs.

The present procedure provides an important advance in the art since, by reacting an alkylene oxide with a thiocyanic ion, it is possible to obtain the desired N-carbamyl-2-imino-1,3-oxathiolane in possibly a single working step or, at the maximum, two working steps, and in addition, the present process avoids the use of the highly noxious alkali cyanate in the process.

Since the desired N-carbamyl-2-imino-1,3-oxathiolane product precipitates from the reaction medium either in the hot or cold state, there is no problem with respect to its separation from the reaction medium and following its separation, the precipitate is washed or crystallized and then dried.

One variation of the present process involves extraction of the condensation product of the alkylene oxide with the thiocyanic acid salt from the aqueous solution at a pH of from 5 to 7 by use of appropriate organic solvent before subjecting said condensation product to the heating between 50° and 80° C. The heating is carried out in the solvent and may advantageously be effected at the boiling point of the latter, under reflux.

DETAILED DESCRIPTION OF THE INVENTION

In accordance with the process of the present invention, N-carbamyl-2-imino-1,3-oxathiolanes are prepared by a process involving.

(a) contacting an alpha-alkylene oxide with an aqueous solution of a salt of thiocyanic acid at a temperature of from 0° to 30° C. while maintaining the pH of the reaction mixture within the range of from 5 to 7;

(b) heating the reaction product thus formed, upon stabilization of the pH thereof, to temperatures between 50° and 80° C.

(c) terminating the heating step when, upon cooling a portion of the reaction product to ambient temperatures, there is no precipitation of N-carbamyl-2-imino-1,3-oxathiolanes; and (d) separating the N-carbamyl-2-imino-1,3-oxathiolane precipitate from the reaction mixture.

The products of the present invention that is, the N-carbamyl-2-imino-1,3-oxathiolanes are represented by the following formula:

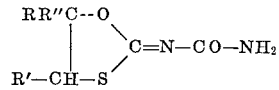

wherein R, R' and R" each represent a hydrogen atom or a hydrocarbon radical, preferably an alkyl, aryl or cycloalkyl radical, and particularly, alkyl having from 1 to 6 carbon atoms, phenyl and alkylphenyl in which the alkyl group has from 1 to 4 carbon atoms and cycloalkyl such as cyclopropyl, cyclobutyl, cyclohexyl, and the like.

In carrying out the process of the present invention, it is essential that the alpha-alkylene oxide should be contacted with the thiocyanic acid salt at a pH of between 5 and 7 as, at a lower pH, a thiocyanato hydroxyalkane is formed and this in turn leads to the formation of an oxathiolane salt thereby producing a mono-thiocarbonate of the corresponding alkane and not the desirable product, i.e., the N-carbamyl-2-imino-1,3-oxathiolane.

A variety of alkylene alpha-oxides can be used in the present process. Generally, however, the alkylene oxides which are used in the present process are represented by the formula

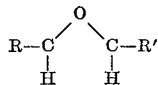

wherein R, R' and R'' may each be hydrogen, an alkyl group containing from 1 to 6 carbon atoms, phenyl or alkylphenyl having the formula

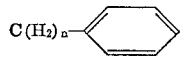

in which $n$ is an integer of from 1 to 4, the alkylene oxide containing from 2 to 6 carbon atoms in the alkylene moiety. Illustrative alpha-oxides of the following alkenes may thus be utilized: ethylene, propylene, butylene, isobutene, pentenes, hexenes, styrene, phenylpropylene, 1,2-diphenylethylene, 1-phenyl-3,4-butene, 1,4-diphenyl-2,3-butene, etc.

In the reaction between the alkylene oxide and thiocyanic acid salt, the proportions of the reactants used generally varies from ½ to 2 moles of the alkylene oxide per mole of the thiocyanic acid salt. It is preferred that stoichiometric amounts that is, equi-molar proportions of the two reactants, should be used. The thiocyanate solutions used are preferably concentrated with a content varying, for example, between 4 and 20 moles per litre, maximum concentration depending upon the solubility, in water, of the salt used.

In order to maintain the pH of the medium between 5 and 7 preferably, at a pH of about 6, during the condensation, a progressive addition of a solution of strong acid such as, for example, hydrochloric acid or sulfuric acid, is used.

In the heating step, that is, the heating of the condensation product of the alpha-alkylene oxide and thiocyanic acid salt, said heating is carried out in a solvent such as, for example, a halogenated hydrocarbon and illustratively, chloroform, dichloroethane, and the like.

The desired product which is obtained can be purified by conventional procedures and the purification is generally effected by crystallization in a suitable solvent, such as, for example, water and/or ethanol.

The following non-limitative examples serve to illustrate the process of the present invention. Unless otherwise indicated, parts are given by weight and the temperatures are in degrees centigrade.

EXAMPLE 1

Two moles of potassium thiocyanate (195 grams KSCN) in 200 ml. of water is added to a 1-liter reactor which is equipped with a stirrer device, a dipping tube for bubbling gas, a cooler the outlet of which is connected to a torch (flame vent), a glass electrode connected to a pH meter and a graduated funnel. The contents of the reactor are cooled to 5° C. and maintained at this temperature while ethylene oxide is passed through the solution at the rate of 1 mole of $(CH_2)_2O$ per hour i.e., about 25 liters per hour.

Throughout the time that the gas is bubbled into the solution, the pH of the reaction medium is maintained at a pH of 7 by progressive addition of a concentrated aqueous hydrochloric acid solution. When 2 moles of ethylene oxide have been introduced (after two hours), the temperature in the reactor is adjusted to ambient temperature. Stirring of the solution is continued until the pH is stabilized at a pH of 7 without requiring further addition of acid. At this point, four successive extractions are effected each extraction involving the use of 100 ml. of chloroform and the four fractions are then mixed. (The mixture contains the organic phase extracted from the aqueous solution of the reactor.)

The chloroformic solution is heated and maintained at reflux temperature (about 64° C.); the N-carbamyl-2-imino-1,3-oxathiolane which is formed precipitates after 30 minutes. The heating is continued for a total period of one hour after which the precipitate is separated by filtration and dried. The precipitate is then recrystallized from ethyl alcohol.

N-carbamyl-2-imino-1,3-oxathiolane of the formula

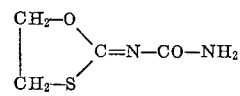

is obtained in a yield of 33%, based on the KSCN used, in the form of a white solid, melting at 165°–166° C.

The infra-red analysis (tablet in KBr) of this product shows intense bands for:

650 cm.$^{-1}$=C—S—≡
1380 cm.$^{-1}$=C—O—C≡
1650 cm.$^{-1}$=C=O
1650 cm.$^{-1}$=NH$_2$

EXAMPLE 2

The same procedure is followed as in Example 1 except that the pH is maintained at a pH of 5 instead of a pH of 7. The purification of the N-carbamyl-2-imino-1,3-oxathiolane is effected by recrystallization from water. The product is obtained in a yield of 37% based on the KSCN used.

EXAMPLE 3

The procedure of Example 1 is repeated except that the pH of the reaction mixture is maintained at a pH of 4 instead of a pH of 7. The product is obtained in a yield of 24%.

EXAMPLE 4

The same procedure is used as in Example 1 except that, instead of chloroform, the extraction is effected by the use of 1,2-dichloroethane. The solution is then heated to a reflux temperature of about 82° C., i.e., the boiling point of the 1,2-dichloroethane solvent. The desired product is obtained in a yield of 19%.

EXAMPLE 5

Following the procedure of Example 1 except for the replacement of ethylene oxide by 2,3-butene oxide of the formula

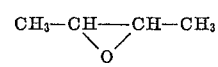

a yield of 33% of the N-carbamyl-4,5-dimethyl-2-imino-1,3-oxathiolane product is obtained.

EXAMPLE 6

Two moles of ammonium thiocyanate (152 g. SCN—NH$_4$) in 120 ml. of water is added to a 1-liter reactor which is equipped with a stirrer device, a dipping tube for bubbling gas, a coder the outlet of which is connected to a torch (flame vent), a glass electrode connected to a pH meter and a graduated funnel. Two moles of ethylene oxide are then introduced into the reactor and the temperature of the reaction mixture is maintained between 15° and 23° C. for a period of two hours. The reaction medium is kept at a pH of 6 by the progressive addition of a 50% aqueous solution of sulfuric acid. On completion of the bubbling of the ethylene oxide, the contents of the reactor are further stirred until the pH of the solution is stabilized at a pH of 6; this stability characterizes the completion of the condensation reaction.

The solution is then heated to a temperature of 70° C., under reflux, for 1½ hours and the solution is then allowed to cool to ambient temperature. The N-carbamyl-2-imino-1,3-oxathiolane product which is formed then precipitates and the precipitate is separated by filtration. After drying, the product is recrystallized twice from aqueous ethanol; 90 grams of the product is obtained in a yield of 31% based on the ammonium thiocyanate.

The N-carbamyl-2-imino-1,3-oxathiolanes of the present invention can be applied alone directly to the soil or the aforesaid compounds may be formulated on granules for application with a conventional fertilizer spreader, as an emulsifiable concentrate or in the form of a wettable powder for application, as in a dilute spray, as a dust for application with a conventional duster or adsorbed on activated carbon for application on seeds.

The pesticidal compounds of the present invention are effective even when employed in dilute concentrations i.e., in concentrations of up to 5% or even higher, and it is therefore preferred to incorporate said pesticidal compounds in a variety of suitable solid or liquid carriers or diluents. Such compositions can be prepared either in the form of a suspension in a suitable non-solvent or as a dust. A suspension or dispersion of the pesticidal compound in a non-solvent such as water may be prepared for direct application to infested soil. Alternatively, a prepared suspension of the compound may be modified by the addition thereto of small amounts, usually from about 1 to about 5 parts, of a commercially available dispersing or surface active agent per 100 parts of the pesticidal compound. Examples of surface active compounds which can be used include the sodium salt of polymerized propyl naphthalene sulfonic acid, an alkyl aryl polyether alcohol and a modified phthalic glycerol alkyd resin.

In the preparation of dust, the pesticidal compound may be admixed with a finely divided inert granular material as a carrier in any conventional manner. Useful carriers include kaolin, bentonite, talc, pumice, silica, chalk, wood flour, fuller's earth, activated carbon, charcoal, and the like.

The following examples further illustrate the invention but are not to be construed as limiting said invention.

EXAMPLE 7

Aqueous solutions at concentrations of 0.1, 0.01 and 0.001% by weight of the following representative N-carbamyl-2-imino-1,3-oxathiolanes as well as known related compounds were prepared and 4 ml. of each solution were placed in vials. To each vial, were added 100 Anguillula nematodes. The vials were rotated for 20 hours and then mortality counts were recorded as shown in Table I below.

TABLE I

| Compound | Percent kill of nematodes with solution at— | | |
|---|---|---|---|
| | 0.1% | 0.01% | 0.001% |
| N-carbamyl-2-imino-1,3-oxathiolane | 100 | 100 | 60 |
| N-carbamyl-4,5-dimethyl-2-imino-1,3-oxathiolane | 100 | 85 | 30 |
| N-methyl-carbamate of 2-oximino-1,3-dithiolane [1] (Control I) | 100 | 100 | 100 |
| N-ethyl-carbamate of 2-oximino-1,3-dithiolane [1] (Control II) | 100 | 100 | 0 |

[1] Disclosed in U.S. 3,183,148.

EXAMPLE 8

In the next test, a representative number of N-carbamyl-2-imino-1,3-oxathiolanes as well as a known oxathiolane compound were separately mixed thoroughly into oil either as a granular formation or in an aqueous carrier not exceeding 6 kilograms of active ingredient per hectare (10,000 square meters). After the compounds were mixed in the soil, an aliquot of root-knot nematode larvae, eggs and galled root tissue were added. The treated infested soils were then put into suitable containers maintained at 80° F. After seven days, one seedling of tomato plant was placed in each container. The treated plants were allowed to stand for a period of 21 days, the tomato plant roots were then washed free of soil and rated according to the root-knot nematode galling present. The following gall index was employed:

0=complete absence of galls
1=1 to 10 galls
2=severe galling

The recorded results are shown in Table II below.

TABLE II

| | Dosage, kilograms per hectare | Root-Knot index replication | |
|---|---|---|---|
| N-carbamyl-2-imino-1,3-oxathiolane | 2 | 13 | 8 |
| | 6 | 0 | 0 |
| N-carbamyl-4,5-dimethyl-2-imino-1,3-oxathiolane | 2 | 11 | 17 |
| | 6 | 0 | 0 |
| N-methyl-carbamate of 2-oximino-1,3-oxathiolane (Control I) [1] | 1 | | |
| | 2 | 9 | 5 |
| | 4.5 | 0 | 0 |
| Control: No additive | 0 | 32 | 41 |

[1] Disclosed in U.S. 3,183,148.

As indicated above, the pesticidal compounds may be effectively applied to soils in various ways such as, for example, in a dust for application with a duster, as an emulsion for application with sprayers, on granules for application with a conventional fertilizer spreader, or adsorbed on activated carbon for application to seeds. Whatever the method of application, a good practice is to apply the N-carbamyl-2-imino-1,3-oxathiolanes in concentrations varying up to ten kilograms per hectare for the effective control of pesticides and specifically nematodes, as well as other parasitic worm life.

I claim:

1. A method of controlling nematodes which comprises applying thereto an effective amount of an active N-carbamyl-2-imino-1,3-oxathiolane compound of the formula

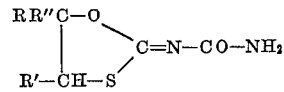

wherein R, R' and R" each represent hydrogen, alkyl of 1 to 6 carbons, phenyl, alkylphenyl in which the alkyl group has from 1 to 4 carbon atoms, cyclopropyl, cyclobutyl or cyclohexyl.

2. The method of claim 1 wherein the active compound is N-carbamyl-2-imino-1,3-oxathiolane.

References Cited

UNITED STATES PATENTS 3,183,148   5/1965   Cannon et al. _____ 424—277
3,193,561   7/1965   Addor _____ 424—277

FOREIGN PATENTS 1,414,036   9/1965   France _____ 260—327

ALBERT T. MEYERS, Primary Examiner
F. E. WADDELL, Assistant Examiner